Nov. 22, 1955 W. A. SORGE 2,724,452
SEISMIC PROSPECTING
Filed March 30, 1951 3 Sheets-Sheet 1

William A. Sorge Inventor
By J. L. Small Attorney

Nov. 22, 1955   W. A. SORGE   2,724,452
SEISMIC PROSPECTING
Filed March 30, 1951   3 Sheets-Sheet 2

William A. Sorge   Inventor

William A. Sorge Inventor

By J. C. Small Attorney

United States Patent Office 2,724,452
Patented Nov. 22, 1955

2,724,452

SEISMIC PROSPECTING

William A. Sorge, Tulsa, Okla., assignor to Esso Research and Engineering Company, a corporation of Delaware Application March 30, 1951, Serial No. 218,325

2 Claims. (Cl. 181—.5)

This invention relates to an improved system and method for controlling the direction of downward travel of maximum seismic energy in seismic prospecting. More particularly the invention concerns an improvement in the technique of imparting energy to the ground for seismic prospecting purposes wherein a continuous line of explosive is detonated, the line of explosive being arranged with at least one end above the ground and set at a calculated angle with the ground.

A method commonly employed for prospecting for oil or other mineral deposits in that known as seismic prospecting wherein an explosive charge is detonated in a shot hole and the motion of the earth from the resulting seismic disturbance is detected at a number of points spread out in a desired pattern from the shot hole, sensitive pickups or geophones being employed to translate the detected motion into electrical impulses which after suitable amplification are recorded on a seismograph. Conventionally, a seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided by well known means with suitable timing marks so that when the seismograph record or seismogram is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

It has recently been reported that more effective results can often be obtained in seismic prospecting if the seismic shock is initiated by detonating a plurality of explosive charges positioned above the earth's surface but in close proximity thereto, say at about 6 to 10 feet above the surface, the charges normally being arranged in symmetrical patterns such as hexagons, star shaped patterns and the like. This method is known by the general term of air shooting and has been described, for example, by T. C. Poulter in Geophysics, vol. 15, page 18 (April 1950).

Although the air shooting technique has enabled seismic prospecting crews to obtain reflection records indicative of underlying strata that could not previously be obtained satisfactorily in the same areas with the older methods wherein the seismic energy was obtained from a shot placed in a shot hole bored in the ground, yet in many instances the air shooting technique has left much to be desired. For example when the recommended hexagonal or star shaped patterns have been employed for the plurality of explosive shots the signal-to-noise ratio on the seismograph record has often been too high to give a usable or reliable record. Also, in many instances, shear waves generated near the seismic source and traveling horizontally through the earth to the seismic detectors often interfere seriously with obtaining a usable record.

It is an object of the present invention to provide a method and means of air shooting wherein maximum directivity of downward travelling energy and the maximum energy "punch" can be obtained with a minimum amount of explosive.

In accordance with this invention greatly improved results are obtained in seismic prospecting if an elongated continuous line of explosive is employed arranged adjacent the earth's surface at a selected distance from a spread of seismic detectors with at least one end of the line being placed above the surface of the earth so that the line will define a pre-determined angle with the surface of the ground. As will be fully described hereinafter, the desired angle is determined on the basis of the relationship between a selected desired angle made by a horizontal line and the line constituting the wave front of maximum energy directed downward to a selected reflecting substratum, the depth of the selected reflecting layer, the velocity of detonation of the explosive, the velocity of propagation of sound waves in the air and the average velocity of propagation of sound waves in the earth between the surface and the selected reflecting substratum.

The nature and objects of the invention and the manner in which it is to be performed will be clearly understood from the following description and from the accompanying drawings in which.

Figure 1:
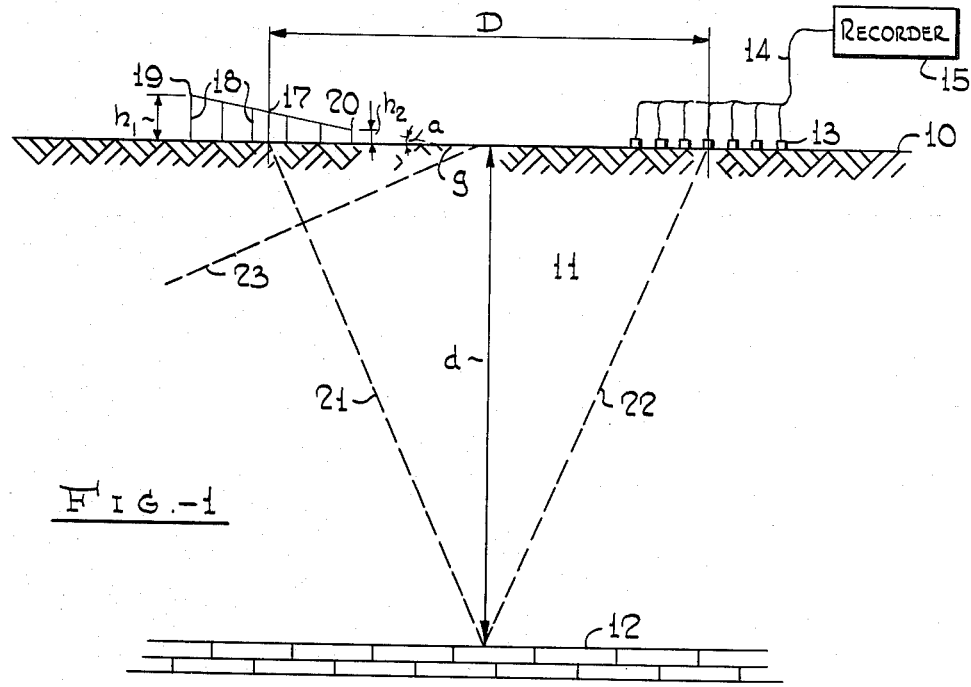
Figure 1 is a diagrammatic representation of the general arrangement of a continuous line of explosive in accordance with this invention as related to a section of earth being prospected, a selected subsurface layer from which reflected energy is to be detected and a spread of geophones arranged to detect reflected seismic waves.

With particular reference to Figure 1 a schematic representation of a vertical section of the earth being prospected is shown. A spread of geophones 13 is laid out in the conventional manner on the surface of the ground 10. The geophones are connected through cable 14 to a multiple channel recorder 15 which may be of the conventional type. At a predetermined distance D from the spread of geophones an elongated explosive charge 17 held on suitable supports 18 is placed so that on proper detonation of explosive 17 seismic energy will be directed downward through the earth 11 and some of the energy will be reflected upwardly by a highly reflective layer such as 12. That portion of the energy that travels in the general direction of line 21 will be reflected upwardly in the general direction of line 22 to be detected by the geophones 13.

As already mentioned, in accordance with this invention at least one end of the elongated line of explosive is placed above the surface of the earth so that the line will define a predetermined angle with the surface of the ground. Thus one end 19 is supported at a height $h_1$ and the other end 20 is supported at a height $h_2$ so that the line of explosive 17 will define an angle $a$ with a horizontal line, i. e. with the surface of the ground, angle $a$ being an acute angle whose open end is directed away from the spread of detectors. Angle $a$ is determined by several factors, one of them being the desired direction of travel of maximum energy downwardly to a reflecting layer such as layer 12. This direction in turn is determined by the distance D between the center of the explosive 17 and the center of the spread of geophones 13. The angle defined by lines of energy travel 21 and 22 will be determined by the distance D and the distance $d$, the latter being the vertical distance between the surface of the ground 10 and reflecting layer 12. The desired direction of maximum energy travel, i. e. the direction along line 21 having been determined, it is desired to have the wave front of maximum energy lie along a line perpendicular to line 21, i. e. along line 23. It will be seen that line 23 makes an acute angle $g$ with horizontal line, i. e. with the surface of the ground.

In accordance with the present invention it has been found that the angle $a$ at which the explosive 17 should be placed with respect to the ground can be readily determined from angle $g$, the velocity of detonation of the explosive, the velocity of propagation of sound waves in the air, and the average velocity of propagation of sound waves in the earth between the earth's surface and the selected reflecting layer. This is expressed by the following equation:

$$\text{angle } a = \arcsin \frac{Va}{Ve} - \arcsin \left[ \frac{Va}{Vg} \sin \text{ angle } g \right]$$

where angles $a$ and $g$ are as defined above, $Va$ is the velocity of sound in air, $Ve$ is the velocity of detonation of the explosive and $Vg$ is the average velocity of sound in the layers of earth overlying the selected reflecting layer. Methods for ascertaining these velocities are well known. For best results it is preferred that angle $g$ be not substantially less than 5 degrees and not substantially greater than 20 degrees.

The elongated explosive employed in practicing this invention may comprise any of the commercially available types known as detonating fuse or Cordeau fuse, i. e. those fuses consisting of narrow tubes filled with high explosives, which when detonated at one end with a suitable detonator will initiate an explosive wave that will travel along the fuse at a high velocity. Such fuses are designed to detonate at a substantially constant and reproducible predetermined rate. For the purposes of the present invention explosives designed for propagation rates of from about 15,000 to about 30,000 ft. per second are to be employed. The explosive charge in such fuses may comprise trinitrotoluene, nitrocellulose, picric acid, pentaerythritol tetranitrate, or similar explosive and the tube itself may comprise a metal sheath such as one made of aluminum, tin or lead or it may be a waterproof textile fabric. One example of an explosive that is particularly useful for this invention is that known as Primacord Bickford which consists of a tube of waterproof textile filled with finely powdered pentaerythritol tetranitrate.

In order that the seismic energy will have the proper wave form it is preferred that the explosive be sufficiently elongated that on detonation the explosion time will be at least 3 milliseconds. This time may range on up to about 40 or 50 milliseconds. Thus, for the explosives mentioned the line of explosive will necessarily be at least 50 feet long and may be as much as 1000 feet long. Preferably, lengths of 200 to 500 feet are employed.

Figure 2:
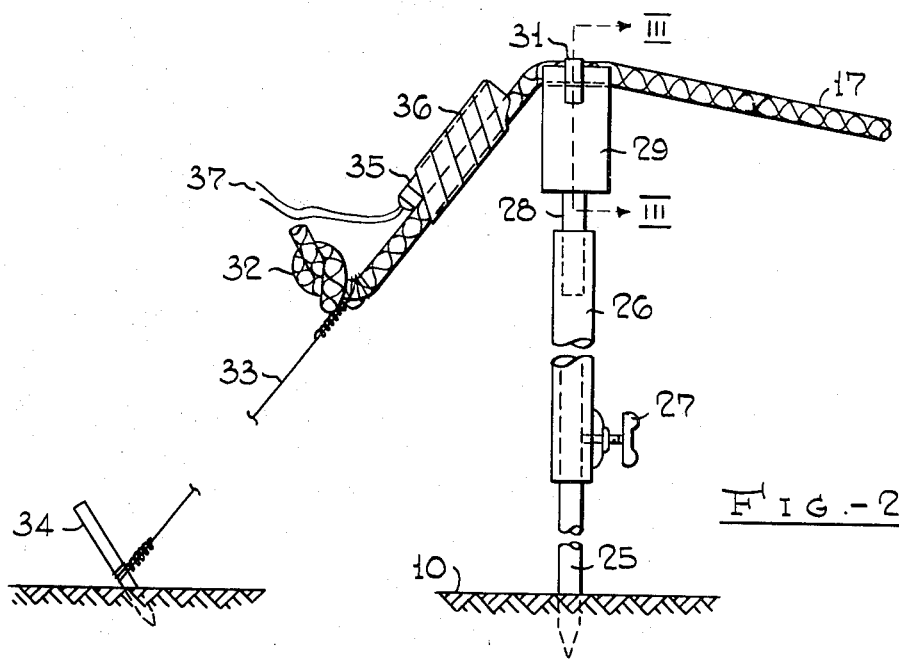
Figure 2 is an elevational view showing one means that may be employed for supporting the explosive line at a selected angle in relation to the ground, means for fastening the ends of the explosive and means for detonating the explosive.
Figures 3, 5:
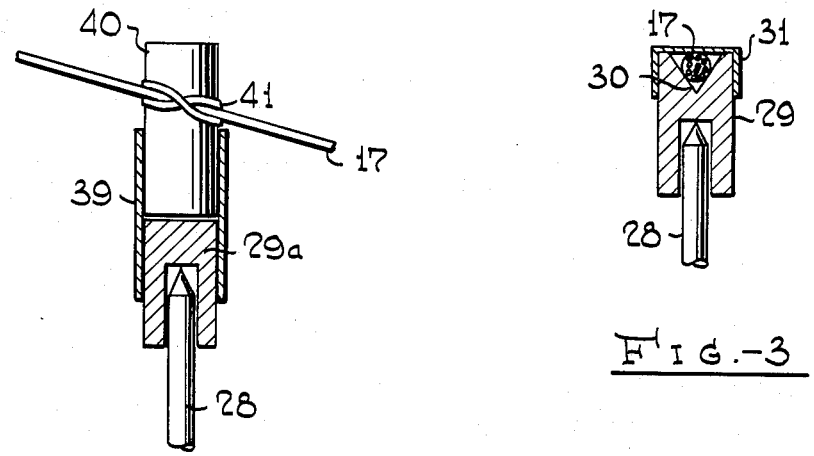
Figure 3 is a sectional view taken along line III—III of Figure 2.
Figure 5 depicts a portion of an alternative embodiment of the invention, showing enlarged volumes of explosive that may be placed in a spaced pattern along the continuous line.

In general the best effect will be obtained by having both ends of the explosive raised at least 1 ft. and up to about 20 ft. above the ground, although in some instances it may prove advantageous to have one end of the explosive contact the ground. One method of supporting the explosive is to employ stakes of adjustable height and to anchor the ends of the explosive with rope, wire or the like. An example of one system for so supporting the explosive is illustrated in Figs. 2 and 3, Fig. 2 being an elevational view showing one end of the explosive supported on a stake and anchored to the ground by means of a wire, and Fig 3 being a sectional view taken along line III—III of Fig. 2. A stake or rod 25 is driven into the ground and is provided with a tubular extension 26 to permit adjustment of the height of the explosive above the ground, a wing-type bolt 27 being employed to fix tube 26 against slidable movement on stake 25 when the desired height adjustment has been made. Conveniently stake 25 and tubular extension 26 may be made of metal.

A short rod 28 with its top end pointed or rounded as shown in Fig. 3 is suitably fastened to the upper end of tubular extension 26 and a wooden plug 29 having a hole bored in the bottom is fitted over rod 28. A groove 30 is cut into the top of plug 29 to receive a portion of the line of explosive 17. Conveniently, a strap or cord 31 is laid over the top of the explosive 17 and fastened to the sides of the plug 29 to keep the explosive in the groove. A knot 32 is tied in the end of the explosive and a wire 33 is looped around the explosive above the knot, the end of the wire is twisted about itself as shown, and the other end of the wire is similarly fastened to a stake 34 driven into the ground. A detonating cap 35 with its "business end" pointed in the desired direction of detonation of explosive is laid along the explosive as shown and held in place by tape 36. Leads 37 conduct current to detonator 35 when it is desired to set off the explosion.

The opposite end of the explosive is similarly anchored and intermediate portions of the explosive are supported with stakes similar to those shown in Fig. 2. It will be seen that it is a simple matter to adjust the height of each stake to provide the desired angle $a$ between the explosive line and the surface of the ground.

Figure 4:
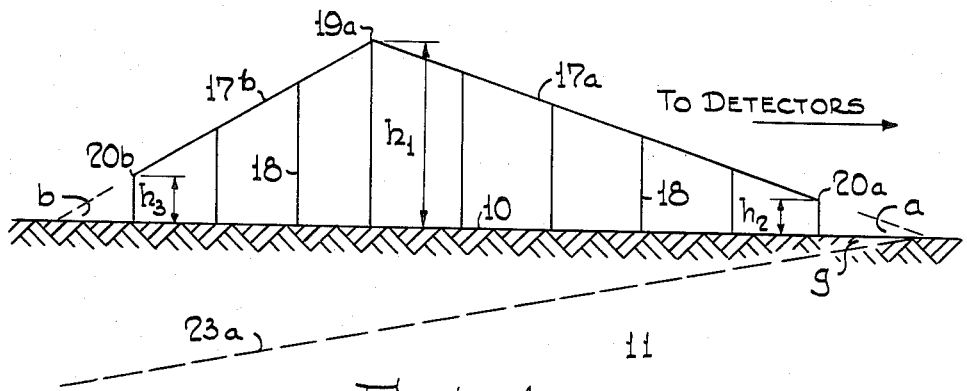
Figure 4 is a schematic diagram showing a continuous line explosive arrangement that is particularly advantageous in practicing this invention.

In some instances it will be found particularly advantageous to employ an arrangement of explosive wherein the explosive line defines a triangle with the ground. One such arrangement is shown schematically in Figure 4. The line of explosive 17 comprises two sections 17a and 17b which may be separate lines or one continuous line, supported on stakes 18. Line 17a is supported at point 19a at a distance $h_1$ above the ground and at point 20a at a distance $h_2$ above the ground, thereby defining angle $a$ with the ground as in Figure 1. Similarly line 17b is supported at one end at point 19a at a height $h_1$ above the ground and at its other end at point 20b at a distance $h_3$ above the ground thereby defining angle $b$ with the ground, angle $b$ being an acute angle whose open end is directed toward the spread of detectors. Detonation of the explosive is initiated at point 19a. It will be noted that angle $a$ opens away from the spread of geophones and that angle $b$ opens toward the spread of geophones. However, the wavefront of maximum energy from explosive line 17b will lie along a line coinciding with the line representing the wavefront of maximum energy from explosive line 17a, this wavefront line being designated 23a in Figure 4. The principal advantage of the arrangement shown in Figure 4 is that the air shock wave dissipated sidewise of the explosive line in this case is less than that dissipated when using a straight line of explosive as in Figure 1 of the same total length as 17a plus 17b. The relation between angle b and angle g in Figure 4 is expressed by the equation $$\text{angle } b = \arcsin \frac{Va}{Ve} + \arcsin \left[\frac{Va}{Vg} \sin \text{angle } g\right]$$

wherein the variables have the same values as outlined above in the equation for angle a. It is evident that to obtain the desired directivity, i. e. so that the wavefront will form an acute angle with the horizontal surface of the ground, angles a and b will not be equal in size.

An added punch can be imparted to the downwardly traveling seismic energy when employing the present invention by effectively enlarging the cross-section of the explosive line at selected spaced intervals as compared to the average cross-section of the line. The simplest way to do this is to support sticks of dynamite or similar explosive on the stakes 18 and to tie the elongated explosive 17 to the side of each stick of dynamite. One means for doing this is shown in Figure 5 which is a fragmentary view of the upper portion of one of the stakes 18 with a plug and sleeve arrangement for supporting the dynamite. For clarity of illustration the plug and sleeve are shown in section. A wooden plug 29a, which differs from plug 29 in having no groove on its top side, is fitted over rod 28. Plug 29a is tapered at the top to permit a sleeve 39 of expendable material such as paper or cardboard to be slipped over the plug to support a stick of dynamite or other explosive 40. The explosive fuse 17 is tied to the side of the dynamite by means of a tape, cord or wire 41. At the detonating end of the explosive line the arrangement would be essentially the same as at Figure 2 with the exception that line 17 would pass through a hole drilled in the dynamite instead of lying in the groove in plug 29.

Figure 6:
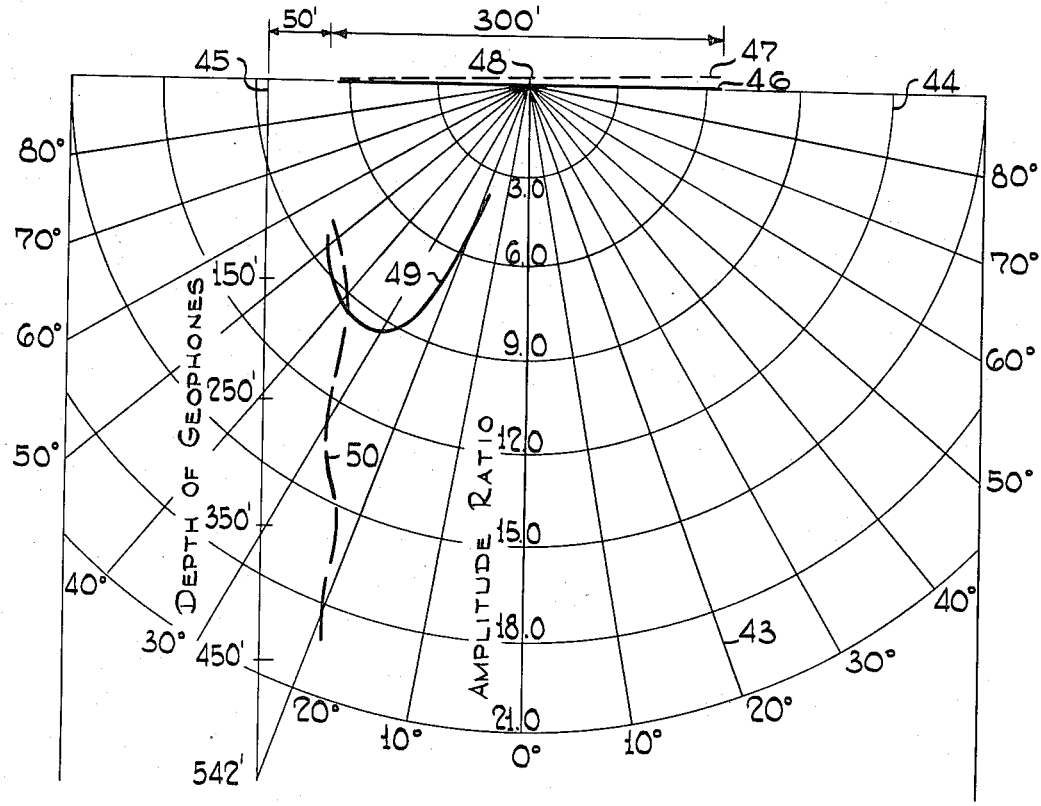
Figure 6 is a graph showing the energy received at various depths below the earth's surface from an elongated explosive as compared to the energy from a single conventional air shot and indicating the directivity effect produced.

The directivity effect produced by placing an elongated shot at a calculated angle with the ground is shown graphically in Figure 6 which is a plot, on superimposed rectangular and polar coordinates, of the ratios of energy received at various depths in a bore hole from the elongated explosive and from a single concentrated shot located at the mid point of the elongated explosive. In Fig. 6 radial lines 43 represent degrees from a vertical line and semi-circular lines 44 represent amplitude ratios increasing in magnitude from the center of the polar coordinates. Vertical line 45 represents depths below the surface at which detection of transmitted energy was made. Horizontal line 46 represents a line of explosive 300 ft. long with its center coinciding with the center of the polar plot. Line 47 represents a similar 300 ft. length of explosive with one end contacting the ground and with the other end raised 10 ft. above the ground.

To obtain the data plotted in Figure 6 the following tests were performed. An elongated shot 300 ft. long was laid out on the ground as indicated with one end placed 50 ft. from a vertical bore hole drilled to a total depth of at least 542 ft. The explosive material used had a rated velocity of detonation of about 20,000 feet per second. Geophones were placed in the hole at depths of 150, 250, 350, 450 and 542 ft. The explosive shot was detonated at the end farthest from the bore hole and the energy wave motion detected by the various geophones in the hole was recorded on a multi-trace seismograph in the conventional manner. A similar test was made in which a 300 ft. line of explosive was placed with the end nearest to the bore hole in contact with the ground and with the end farthest from the bore hole 10 ft. above the ground. This explosive shot was detonated and the record made as before. A third test was made in which a single ½ lb. gelatin dynamite shot (60% strength) supported 8 ft. above the ground on a stake similar to that shown in Figure 5 was detonated. The ratio of the trace amplitude of the detected waves from the elongated explosives and from the single shot as detected at each geophone location was determined.

These ratios were then plotted on Figure 6 in the following manner: the ratio from the elongated shot lying on the ground as compared to the single shot for the 150 ft. depth was located on the appropriate semi-circular line 44. A straight line was drawn from the point indicated on line 45 for the 150 ft. depth to the center point 48 and the intersection of this line with the selected semi-circular line 44 was plotted. The same procedure was repeated for the ratios determined at 250 ft., 350 ft., etc. A smooth curve drawn through the plotted points gave line 49. In the same manner line 50 was obtained by plotting the amplitude ratios from explosive shot 47 and a single shot at point 48. Line 49 and line 50 each represent the locus of all points lying on one-half of the leading edge of a wavefront of maximum energy travel. If the other half of each of these leading edges is plotted as a mirror image of the lines shown it will be seen that by raising one end of the explosive line as indicated by line 47 the angle the line of maximum wave motion makes with the ground can be changed to less than 20° as compared with 33° when the explosive lies flat on the ground as indicated by line 46.

Figure 7:
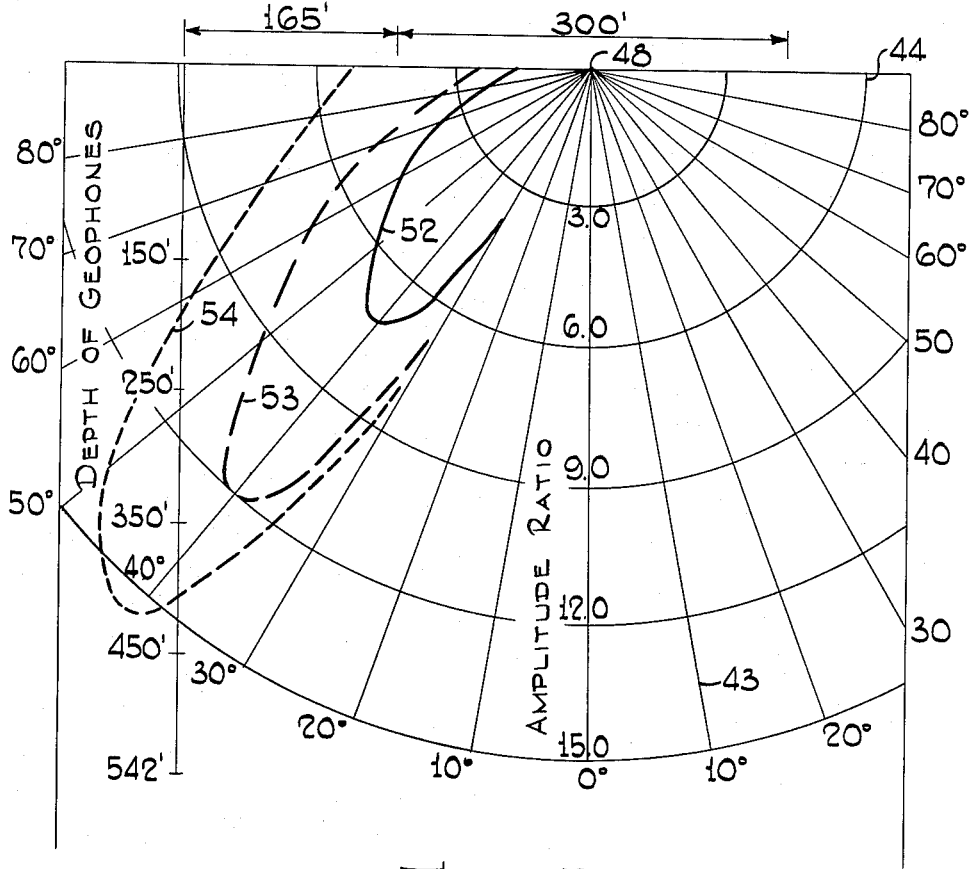
Figure 7 is a similar graph indicative of the "punch" imparted to the ground by raising the elongated shot in the air in accordance with the present invention.

In the same manner as described in connection with Figure 6 other tests were made to determine the increase in "punch" imparted to the ground by raising the elongated shot in the air. The results of these tests are plotted in Figure 7 which is a combination rectangular and polar plot obtained in the same manner as Figure 6. Radial lines 43, semi-circular lines 44 and vertical line 45 have the same significance as in Figure 6. In these tests the end of the line of the explosive closest to the bore hole was placed 165 ft. from the bore hole. Amplitude ratios were obtained in the same manner as described in connection with Figure 6, using a single ½ lb. shot at center point 48 and three elongated shots each 300 ft. long, the first placed on the ground, the second raised 8 inches from the surface and the third 7 ft. from the surface. Curve 52 represents the ratios obtained with the elongated shot on the surface, curve 53 with the shot 8 inches off the ground and curve 54 with the shot 7 feet off the ground.

It is not intended that this invention be limited by the specific embodiments presented in the foregoing description, for many modifications thereof can be made by those skilled in this art without departing from the spirit of the invention, whose scope is defined in the following claims.

What is claimed is:

1. In a system for profiling geologic substrata the combination of at least one seismic detector arranged adjacent the earth's surface, a pair of elongated substantially straight continuous lines of explosive arranged adjacent the earth's surface at a selected distance from and in substantial alignment with said detector, at least one end of each of said lines being placed above the earth's surface, said explosive lines meeting at a point above the earth's surface and defining with the horizontal surface of the ground predetermined opposite unequal acute angles, and means arranged adjacent the meeting point of said lines for detonating said explosives, the said acute angles defined by said lines of explosive with the ground being determined from the relationships:

$$\text{angle } a = \arcsin \frac{Va}{Ve} - \arcsin \left[\frac{Va}{Vg} \sin \text{angle } g\right]$$

and $$\text{angle } b = \arcsin \frac{Va}{Ve} + \arcsin \left[\frac{Va}{Vg} \sin \text{angle } g\right]$$

wherein angle a is the acute angle whose open end is directed away from said detector, angle b is the acute angle whose open end is directed toward said detector, angle g is the acute angle defined by the horizontal surface of the ground and a line perpendicular to the line representing a selected direction of downward travel of a wavefront of maximum energy toward a selected reflecting substratum, V$a$ is the velocity of sound in air, V$e$ is the velocity of detonation of the explosive and V$g$ is the average velocity of sound in the layers of earth overlying the selected reflecting layer.

2. A system according to claim 1 in which angle $g$ has a value not substantially less 5 degrees and not substantially greater than 20 degrees.

References Cited in the file of this patent

UNITED STATES PATENTS

| | | |
|---|---|---|
| 1,899,970 | McCollum | Mar. 7, 1933 |
| 2,133,484 | Sherar | Oct. 18, 1938 |
| 2,340,314 | Farnham | Feb. 1, 1944 |
| 2,545,380 | Poulter | Mar. 13, 1951 |
| 2,580,636 | Wolf | Jan. 1, 1952 |
| 2,693,245 | Hawkins | Nov. 2, 1954 |

FOREIGN PATENTS

| | | |
|---|---|---|
| 701,747 | France | Jan. 13, 1931 |